United States Patent [19]

Abolins et al.

[11] 4,123,475

[45] Oct. 31, 1978

[54] ANTISTATIC POLYPHENYLENE ETHER COMPOSITIONS

[75] Inventors: Visvaldis Abolins; Arthur Katchman, both of Delmar, N.Y.

[73] Assignee: General Electric Company, Pittsfield, Mass.

[21] Appl. No.: 865,322

[22] Filed: Dec. 28, 1977

[51] Int. Cl.$^2$ ............................................. C08L 71/04
[52] U.S. Cl. ................................. 260/874; 260/45.7 P; 260/45.75 B; 260/DIG. 21; 260/DIG. 16; 260/DIG. 24; 526/3; 526/6; 526/4
[58] Field of Search .......... 260/874, 47 ET, DIG. 16, 260/DIG. 21, DIG. 24, 45.7 P, 45.75 B; 526/3, 6

[56] References Cited

U.S. PATENT DOCUMENTS

| | | | |
|---|---|---|---|
| 3,383,435 | 5/1968 | Cizek | 260/874 |
| 4,038,343 | 7/1977 | Yonemitsu et al. | 260/874 |

*Primary Examiner*—Lester L. Lee
*Attorney, Agent, or Firm*—Morgan, Finnegan, Pine, Foley & Lee

[57] ABSTRACT

Thermoplastic compositions comprising a polyphenylene ether resin alone or in admixture with a styrene resin are rendered resistant to the accumulation of surface electrostatic charges by the inclusion, in a minor, effective amount, of an antistatic agent consisting of a mixture of triethanolamine, toluene sulfonic acid and sodium lauryl sulfate. Flame retardant embodiments are also provided.

9 Claims, No Drawings

ANTISTATIC POLYPHENYLENE ETHER COMPOSITIONS

This invention relates to antistatic thermoplastic molding compositions comprising a polyphenylene ether resin with or without a styrene resin, preferably a rubber modified impact resistant polystyrene, and a mixture of triethanolamine, toluene sulfonic acid and sodium lauryl sulfate. The compositions can optionally also comprise flame retardant agents and, in preferred embodiments, will include zinc oxide in small, odor retardant amounts.

BACKGROUND OF THE ART

The term "polyphenylene ether resins" is well known as defining a class of thermoplastic materials which possess outstanding physical properties, including hydrolytic stability, dimensional stability and excellent dielectric characteristics. Methods of preparation are known in the art and described in the patent literature, e.g., Hay, U.S. Pat. Nos. 3,306,874 and 3,306,875 and Stamatoff, U.S. Pat. Nos. 3,257,357 and 3,257,358, incorporated herein by reference to save unnecessary detail. Other patents which show the preparation of polyphenylene ether resins include Bennett and Cooper, U.S. Pat. Nos. 3,639,656 and 3,838,102, as well as Cooper and Bennett, U.S. Pat. Nos. 3,642,699, 3,661,849 and 3,733,299, also incorporated herein by reference.

It is known that when the polyphenylene ether resins are combined with styrene resins, the resulting compositions possess properties which are improved over the corresponding properties of either resin alone. See Cizek, U.S. Pat. No. 3,383,435, the disclosure of which is incorporated herein by reference.

A shortcoming of some thermoplastic materials is the tendency to accumulate surface electrostatic charges. Thermoplastic materials having characteristic resistivities in the range of from about $10^{10}$ to $10^{12}$ ohms normally do not hold static charges. On the other hand, thermoplastic materials characterized by resistivities in the range of from about $10^{16}$ to $10^{18}$ ohms often develop high static voltages, and polyphenylene ether resins and composites of polyphenylene ether resins with styrene resins fall into this latter group.

Such static charges develop during processing and/or during normal use after molding. They are undesirable for a number of reasons: surface static charges readily attract dust and other contaminants which are unsightly and difficult to clean; often the contaminants or static charges themselves cause processing problems; the charges may accumulate to a level where an unpleasant electrical shock is imparted upon touching; in addition, a high level of static charges in a molded part covering sensitive electronic equipment may be undesirable.

Previous attempts to produce essentially static-free polyphenylene ether compositions have not been entirely satisfactory. The present invention is based on the discovery that triethanolamine, toluene sulfonic acid and sodium lauryl sulfate, when used in combination in a polyphenylene ether composition, readily dissipate static charges and results in compositions which are essentially free from the aforementioned shortcomings of prior art compositions.

DESCRIPTION OF THE INVENTION

This invention provides, in its broadest aspects, antistatic thermoplastic compositions suitable for molding which comprise:

(a) a polyphenylene ether resin with or without a styrene resin, and (b) a minor, effective amount of an antistatic agent consisting of a mixture of triethanolamine, toluene sulfonic acid and sodium lauryl sulfate.

The antistatic agent provides, in effect, a conductive pathway for bleeding off surface electrostatic charges from the non-conductive resinous components.

Preferably, but not necessarily, the ingredients of component (b) are employed in amounts such that the weight ratio of triethanolamine and toluene sulfonic acid to sodium lauryl sulfate is about 2:1.

Any of the known isomers of toluene sulfonic acid can be used, e.g., ortho-, meta- and para- isomers, alone or in admixture. Para-toluene sulfonic acid is preferred, however.

Each of the ingredients of antistatic agent (b) is commercially available and methods of their preparation are known. By way of illustration, triethanolamine is prepared conventionally by the reaction of an excess of ammonia with ethylene oxide to give a pale yellow viscous liquid having a slight odor of ammonia.

Sodium lauryl sulfate is prepared conventionally by the sulfation of lauryl alcohol, i.e., esterification with sulfuric acid, followed by conversion into the corresponding sodium salt, e.g., by neutralization with sodium carbonate to form white or cream colored crystals having a slight, characteristic odor.

Toluene sulfonic acid is prepared by the sulfonation of toluene with fuming concentrated sulfuric acid at moderate temperatures, e.g., 25° to 35° C., to give a mixture of paratoluene sulfonic acid in major proportions and ortho- and meta-toluene sulfonic acids in minor proportions. The isomers can be separated by conventional techniques.

The polyphenylene ether resins have the formula

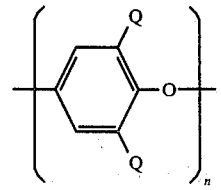

wherein the oxygen ether atom of one unit is connected to the benzene nucleus of the next adjoining unit, $n$ is a positive integer and is at least 50, e.g., from 50 to about 200, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Preferably, within the above formula Q is alkyl, especially alkyl having from 1 to 4 carbon atoms. Illustratively, such resins include poly(2,6-dimethyl-1,4-phenylene)ether; poly (2,6-diethyl-1,4-phenylene)ether; poly(2-methyl-6-ethyl--phenylene)ether; poly(2-methyl-6-propyl-1,4-phenylene)ether; poly(2,6-dipropyl--

-phenylene)ether; poly(2-ethyl-6-propyl-1,4-phenylene)ether; and the like.

Especially preferred is poly(2,6-dimethyl-1,4-phenylene)ether, preferably having an intrinsic viscosity of from about 0.4 to 0.8, more preferably about 0.45 deciliters per gram (dl./g.) measured in solution in chloroform at 30° C.

Methods of preparation are disclosed in the aforementioned patents of Hay, Stamatoff, Cooper et al and Bennett et al.

The styrene resins preferably are those having at least 25% by weight of repeating units derived from a vinyl aromatic compound of the formula:

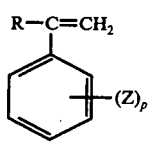

wherein R is hydrogen, (lower)alkyl or halogen; Z is vinyl, halogen or (lower) alkyl; and $p$ is 0 or an integer of from 1 to the number of replaceable hydrogen atoms on the benzene nucleus. Herein, the term "(lower)alkyl" means alkyl of from 1 to 6 carbon atoms.

The term "styrene resin" as used broadly throughout this disclosure includes, by way of example, homopolymers such as polystyrene and polychlorostyrene, as well as polystyrenes which have been modified by natural or synthetic rubber, e.g., polybutadiene, polyisoprene, butyl rubber, EPDM rubber, ethylenepropylene copolymers, natural rubber, polysulfide rubbers, polyurethane rubbers, epichlorohydrin, and the like; styrene containing copolymers such as the styrene-acrylonitrile copolymers (SAN), styrene-butadiene copolymers, styrene-maleic anhydride copolymers, styrene-acrylonitrile-butadiene terpolymers (ABS), poly-α-methylstyrene, copolymers of ethylvinylbenzene and divinylbenzene, and the like; block copolymers of the A-B-A and A-B type wherein A is polystyrene and B is an elastomeric diene, e.g., polybutadiene, radial teleblock copolymers of styrene and a conjugated diene, acrylic resin modified styrenebutadiene resins and the like, and blends of homopolystyrene and copolymers of the aforementioned types.

The polyphenylene ether resins and the styrene resins are combinable in all amounts.

In general, component (b) is present in amounts of at least about 3 parts by weight per one hundred parts by weight of (a), preferably from about 3 to about 5 parts by weight per hundred parts by weight of (a). Amounts greatly in excess of this normally do not provide any further improvements in antistatic behavior and may detract from other physical properties. The ingredients of component (b) can be employed in virtually all proportions with respect to each other but as previously stated, a weight ratio of triethanolamine and toluene sulfonic acid: sodium lauryl sulfate of about 2:1 is preferred in most cases.

In commercial applications where self-extinguishing or flame retardant compositions are desired, flame retardant and/or drip retardant agents can be included. In general, phosphorus-containing flame retardant agents are preferred, such as those selected from among elemental phosphorus or organic phosphonic acids, phosphonates, phosphinates, phosphonites, phosphinites, phosphene oxides, phosphenes, phosphites or phosphates. These can be used alone or in combination with hexabromobenzene or chlorinated biphenyl and, optionally, antimony oxide.

The amount of flame retardant agent, if used, is not critical to the invention, so long as it is present in a minor proportion based on the weight of the composition — major proportions will detract from physical properties — but at least sufficient to render the composition flame retardant or self-extinguishing. Those skilled in the art will understand that the amount will vary with the nature of the resin and efficiency of the flame retardant additive. In general, however, the amount of flame retardant agent will range from about 0.5 to about 40 parts by weight per one hundred parts of (a).

Other ingredients can also be included for their conventionally employed purposes, such as drip retardants, plasticizers, antioxidants, stabilizers, reinforcing agents, pigments, dyes, processing aids, and the like.

The manner in which the present compositions are prepared is not critical. In one procedure, a blend premix is formed by tumbling the ingredients, the blend premix is passed through an extruder at an elevated temperature, e.g., from about 500° to about 600° F., dependent on the needs of the particular composition, the extrudate is cooled and chopped into pellets and the pellets are molded into any desired shape.

In using the compositions of this invention, some odor generation and/or discoloration may take place during processing at elevated temperatures. It is believed that the odor is due to the presence of toluene sulfonic acid. To counteract these effects, the compounding temperatures can be adjusted downwards and/or zinc oxide can be included in the compositions in odor retardant amounts, e.g., at least 1, preferably from about 2 to about 5 parts by weight per one hundred parts by weight of (a).

DESCRIPTION OF THE SPECIFIC EMBODIMENTS

The compositions of this invention are illustrated in the following examples.

In the examples, the antistatic behavior is measured according to the following procedure: a molded test piece is rubbed vigorously with a wool cloth sufficiently to generate a surface static charge on the test piece, and the test piece is placed near finely divided cigarette ashes. The antistatic behavior is considered "good" if not even trace amounts of the cigarette ashes are attracted. The other physical properties are evaluated according to ASTM standards.

EXAMPLE 1

A composition according to this invention as shown in Table 1 is prepared by tumbling the ingredients to form a blend premix, passing the blend through an extruder at 580° F., cooling the extrudate, chopping it into pellets and injection molding the pellets at 520° F. set cylinder temperature and 180° F. set mold temperature.

For purposes of comparison, similar compositions are prepared, except that each of the ingredients of the antistatic agent is used individually in the composition, instead of in combination. The physical properties are summarized in the Table.

TABLE 1

| Ingredients, parts by weight | 1 | 1A* | 1B* | 1C* |
|---|---|---|---|---|
| poly(2,6-dimethyl-1,4- | | | | |

TABLE 1-continued

| | | | | |
|---|---|---|---|---|
| phenylene)ether | 35 | 35 | 35 | 35 |
| rubber modified high impact styrene resin[a] | 65 | 65 | 65 | 65 |
| triphenyl phosphate | 7 | 7 | 7 | 7 |
| tridecyl phosphite | 0.5 | 0.5 | 0.5 | 0.5 |
| zinc sulfide | 0.15 | 0.15 | 0.15 | 0.15 |
| zinc oxide | 0.15 | 0.15 | 0.15 | 0.15 |
| titanium dioxide | 2.0 | 2.0 | 2.0 | 2.0 |
| triethanolamine | 0.9 | 0.9 | — | — |
| p-toluene sulfonic acid | 1.1 | — | 1.1 | — |
| sodium lauryl sulfate | 1.0 | — | — | 1.0 |
| Physical Properties | | | | |
| Tensile strength at yield, psi | 7,700 | 8,200 | 8,900 | 8,200 |
| Tensile strength at break, psi | 7,000 | 7,600 | 8,500 | 8,000 |
| Tensile elongation, % | 38 | 58 | 72 | 74 |
| Flexural strength, psi | 11,000 | 11,300 | 12,100 | 11,200 |
| Flexural modulus, psi | 347,900 | 347,900 | 382,200 | 353,900 |
| Notched Izod impact strength, ft.lbs./in. | | | | |
| room temperature | 4.1 | 4.1 | 4.3 | 3.4 |
| sub-zero (−40° F.) | 1.6 | 1.6 | 1.7 | 1.9 |
| Gardner impact strength, in.lbs. | | | | |
| room temperature | 175 | 175 | 155 | 75 |
| sub-zero (−40° F.) | 20–25 | 20–25 | 35 | 30–40 |
| Heat distortion temp., ° F. | 212 | 212 | 221 | 257 |
| Gloss, °45 | 45.8 | 45.8 | 44.5 | 45.0 |
| Yellowness index | 44.8 | 44.8 | 39.3 | 46.3 |
| Antistatic behavior | good | none | some | none |

*comparison experiment
[a]FG 834, Foster Grant Co.

It is shown that the composite antistatic agent of this invention results in good antistatic behavior. Paratoluene sulfonic acid when included in the polyphenylene ether composition by itself at a level of 1.1 parts per hundred (phr) results in only some antistatic behavior, which is unsatisfactory, and is responsible for odor generation during the high temperature compounding step.

EXAMPLE 2

Using the procedure described in Example 1, an antistatic composition according to this invention comprising 35 parts by weight of poly(2,6-dimethyl-1,4-phenylene)ether, 65 parts by weight of a rubber modified high impact polystyrene (FG 834, Foster Grant Co.), 7 parts by weight of triphenyl phosphate, 0.5 part by weight of tridecyl phosphite, 0.15 part by weight of zinc sulfide, 2.0 parts by weight of zinc oxide, 2.0 parts by weight of titanium dioxide, 0.9 part by weight of triethanolamine, 1.1 parts by weight of para-toluene sulfonic acid and 1.0 part by weight of sodium lauryl sulfate, is prepared. The physical properties are summarized in Table 2.

TABLE 2

| Physical Properties of Antistatic Composition | |
|---|---|
| Tensile strength at yield, psi | 8,500 |
| Tensile strength, at break, psi | 8,100 |
| Tensile elongation, % | 70 |
| Flexural strength, psi | 12,300 |
| Flexural modulus, psi | 382,200 |
| Notched Izod impact strength, ft.lbs./in. | |
| room temperature | 4.3 |
| sub-zero (−40° F.) | 1.7 |
| Gardner impact strength, in.lbs. | |
| room temperature | 155 |
| sub-zero (−40° F.) | 35 |
| Heat distortion temp., ° F. | 221 |
| Gloss, °45 | 44.5 |
| Yellowness index | 39.3 |
| Antistatic behavior | good |

EXAMPLE 3

Using the procedure described in Example 1, a flame retardant, antistatic composition according to this invention comprising 50 parts by weight of poly(2,6-dimethyl-1,4-phenylene) ether, 50 parts by weight of a rubber modified high impact polystyrene (FG 834, Foster Grant Co.), 3 parts by weight of triphenylphoshate, 1.0 part by weight of tridecyl phosphite, 0.15 part by weight of zinc sulfide, 0.15 part by weight of zinc oxide, 2.0 parts by weight of titanium dioxide, 0.9 part by weight of triethanolamine, 1.1 parts by weight of para-toluene sulfonic acid and 1.0 part by weight of sodium lauryl sulfate, is prepared. The physical properties are summarized in Table 3.

TABLE 3

| Physical Properties of Flame Retardant, Antistatic Composition | |
|---|---|
| Tensile strength at yield, psi | 9,700 |
| Tensile strength at break, psi | 8,400 |
| Tensile elongation, % | 45 |
| Flexural strength, psi | 14,300 |
| Flexural modulus, psi | 353,900 |
| Notched Izod impact strength, ft.lbs./in. | |
| room temperature | 3.4 |
| sub-zero (−40° F.) | 1.9 |
| Gardner impact strength, in.lbs. | |
| room temperature | 75 |
| sub-zero (−40° F.) | 30–40 |
| Heat distortion temp., ° F. | 257 |
| Gloss, °45 | 45.0 |
| Yellowness index | 46.3 |
| Antistatic behavior | good |

EXAMPLE 4

Using the procedure described in Example 1 and a commercially available antistatic agent, the compositions shown in Table 4 are prepared and evaluated for antistatic behavior and other physical properties at 3 parts by weight per hundred parts by weight of resin (phr) and less, as shown.

TABLE 4

| Composition Comprising a Polyphenylene Ether Resin, a Styrene Resin and an Antistatic Agent | | | | |
|---|---|---|---|---|
| EXAMPLE | 4 | 4A* | 4B* | 4C* |
| Ingredients, parts by weight | | | | |
| poly(2,6-dimethyl-1,4-phenylene ether) | 35 | 35 | 35 | 35 |
| rubber modified high impact styrene resin[a] | 65 | 65 | 65 | 65 |
| antistatic agent[b] | 3.0 | — | 1.0 | 2.0 |
| triphenyl phosphate | 7.0 | 7.0 | 7.0 | 7.0 |
| tridecyl phosphite | 0.5 | 0.5 | 0.5 | 0.5 |
| zinc sulfide | 0.15 | 0.15 | 0.15 | 0.15 |
| zinc oxide | 0.15 | 0.15 | 0.15 | 0.15 |
| titanium oxide | 2.0 | 2.0 | 2.0 | 2.0 |
| Physical Properties | | | | |
| Tensile strength at yield, psi | 7,000 | 7,200 | 7,300 | 7,000 |
| Ultimate tensile strength, psi | 6,400 | 6,700 | 6,800 | 6,400 |
| Tensile elongation, % | 58 | 50 | 47 | 60 |
| Flexural strength, psi | 9,960 | 10,540 | 10,920 | 10,350 |
| Flexural modulus, psi | 352,200 | 358,400 | 371,500 | 355,300 |
| Notched Izod impact strength, ft.lbs./in.n. | | | | |
| room temperature | 4.3 | 2.93 | 3.6 | 4.1 |
| sub-zero (−40° F.) | 1.2 | 1.14 | 1.15 | 1.3 |
| Gardner impact strength, in.lbs. | | | | |
| room temperature | 112 | 137 | 111 | 124 |
| sub-zero (−40° F.) | 40 | 34 | 33 | 29 |
| 45° gloss value | 56.8 | 57.3 | 57.7 | 57.9 |

TABLE 4-continued

| | Composition Comprising a Polyphenylene Ether Resin, a Styrene Resin and an Antistatic Agent | | | |
|---|---|---|---|---|
| EXAMPLE | 4 | 4A* | 4B* | 4C* |
| Yellowness index | 30.4 | 27.7 | 30.9 | 31.7 |
| Anti-static behavior | good | none | none | slight |

*comparison experiment
[a] as in Example 1
[b] Antistat 106-G, Fine Organics, Inc.

It is shown that the antistatic agent provides satisfactory antistatic properties at levels of 3 parts per one hundred parts of resin. The addition of the antistatic agent results in a slight increase in yellowness index and odor generation. Both shortcomings are essentially eliminated by adjusting the compounding temperature downwards.

EXAMPLE 5

Using the procedure of Example 1, flame retardant compositions comprising the ingredients and having the properties shown in Table 5 are prepared.

TABLE 5

| | Flame Retardant Compositions Comprising a Polyphenylene Ether Resin, a Styrene Resin and an Antistatic Agent | | | |
|---|---|---|---|---|
| EXAMPLE | 5 | 5A* | 5B* | 5C* |
| Ingredients, parts by weight | | | | |
| poly(2,6-dimethyl-1,4-phenylene)ether | 50 | 50 | 50 | 50 |
| styrene resin[a] | 50 | 50 | 50 | 50 |
| antistatic agent[b] | 3.0 | — | 1.0 | 2.0 |
| triphenyl phosphate | 3.0 | 3.0 | 3.0 | 3.0 |
| tridecyl phosphite | 1.0 | 1.0 | 1.0 | 1.0 |
| zinc sulfide | 0.15 | 0.15 | 0.15 | 0.15 |
| zinc oxide | 0.15 | 0.15 | 0.15 | 0.15 |
| titanium dioxide | 2.0 | 2.0 | 2.0 | 2.0 |
| Physical Properties | | | | |
| Tensile strength at yield, psi | 9,400 | 9,400 | 9,700 | 9,000 |
| Ultimate tensile strength, psi | 8,000 | 8,200 | 8,400 | 8,100 |
| Tensile elongation, % | 67 | 52 | 58 | 67 |
| Flexural strength, psi | 12,840 | 13,030 | 14,180 | 13,410 |
| Flexural modulus, psi | 358,400 | 352,200 | 352,200 | 361,600 |
| Notched Izod impact, ft.lbs./in.n. | | | | |
| room temperature | 3.63 | 2.26 | 2.19 | 3.18 |
| sub-zero (−40° F.) | 1.41 | 0.91 | 0.85 | 1.34 |
| Gardner impact, in.lb. | | | | |
| room temperature | — | 139.8 | 64.2 | 92.4 |
| sub-zero (−40° F.) | — | 27.8 | 14.6 | 22.2 |
| Heat distortion temperature, ° F. | 246 | 251 | 256 | 244 |
| 45° gloss value | 55.1 | 55.0 | 55.0 | 55.7 |
| Yellowness Index | 36.0 | 29.7 | 34.9 | 34.4 |
| Anti-static behavior | good | none | none | slight |

*comparison experiment
[a] as in Example 1
[b] as in Example 4

Other modifications and variations of the present invention are possible in the light of the above disclosure. It is, therefore, to be understood that changes may be made in the particular embodiments of the invention described herein which are within the full intended scope of the invention as defined in the appended claims.

We claim:

1. An antistatic thermoplastic composition which comprises:
   (a) a polyphenylene ether resin with or without a styrene resin, and
   (b) a minor, effective amount of an antistatic agent consisting of a mixture of triethanolamine, toluene sulfonic acid and sodium lauryl sulfate.

2. A composition as defined in claim 1 wherein component (b) is present in an amount of at least about 3 parts by weight per one hundred parts of (a).

3. A composition as defined in claim 1 wherein said toluene sulfonic acid is para-toluene sulfonic acid.

4. A composition as defined in claim 1 wherein in component (b) the weight ratio of triethanolamine and toluene sulfonic acid to sodium lauryl sulfate is about 2:1.

5. A composition as defined in claim 1 wherein the polyphenylene ether resin of (a) has the formula:

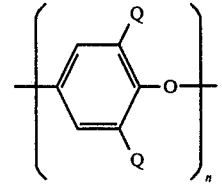

wherein the oxygen ether atom of one unit is connected to the benzene nucleus of the next adjoining unit, $n$ is a positive integer and is at least 50, and each Q is a monovalent substituent selected from the group consisting of hydrogen, halogen hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

6. A composition as defined in claim 5 wherein said polyphenylene ether resin is poly(2,6-dimethyl-1,4-phenylene) ether.

7. A composition as defined in claim 1 wherein the styrene resin of (a) is a rubber modified high impact polystyrene.

8. A composition as defined in claim 1 which also includes an odor retardant amount of zinc oxide.

9. A composition as defined in claim 1 which also includes a flame retardant amount of a flame retardant agent.

* * * * *

UNITED STATES PATENT OFFICE
CERTIFICATE OF CORRECTION

Patent No. 4,123,475　　　　　　　　Dated October 31, 1978

Inventor(s) Visvaldis Abolins et al

It is certified that error appears in the above-identified patent and that said Letters Patent are hereby corrected as shown below:

In Col. 2, line 67, "poly(2-methyl-6-ethyl--phenylene)ether" should read  -- poly(2-methyl-6-ethyl-1,4-phenylene)ether --; on line 68, "poly(2,6-dipropyl--" should read  -- poly(2,6-dipropyl-1,4- --.

In Col. 5, Table 1, approximately line 23, the heat distortion temperature under Example 1C* ("257") should be deleted and -- 213 -- inserted therefor.

Signed and Sealed this

Seventeenth Day of April 1979

[SEAL]

Attest:

RUTH C. MASON
Attesting Officer

DONALD W. BANNER
Commissioner of Patents and Trademarks